(12) United States Patent
Esposito et al.

(10) Patent No.: US 10,586,002 B1
(45) Date of Patent: Mar. 10, 2020

(54) SYSTEM AND METHOD FOR GENERATING NON-DESIGN MANIPULATION ELEMENTS IN AN ELECTRONIC DESIGN

(71) Applicant: Cadence Design Systems, Inc., San Jose, CA (US)

(72) Inventors: Steven Guy Esposito, Westford, MA (US); Vincent Di Lello, Guelph (CA)

(73) Assignee: Cadence Design Systems, Inc., San Jose, CA (US)

( * ) Notice: Subject to any disclaimer, the term of this patent is extended or adjusted under 35 U.S.C. 154(b) by 65 days.

(21) Appl. No.: 15/880,657

(22) Filed: Jan. 26, 2018

(51) Int. Cl.
  *G06F 17/50* (2006.01)
  *G06T 19/20* (2011.01)
  *G06F 3/0484* (2013.01)

(52) U.S. Cl.
  CPC ...... *G06F 17/5045* (2013.01); *G06F 3/04842* (2013.01); *G06T 19/20* (2013.01); *G06T 2219/2004* (2013.01); *G06T 2219/2012* (2013.01)

(58) Field of Classification Search
  CPC .................................................. G06F 17/5045
  USPC ......................................................... 716/110
  See application file for complete search history.

(56) References Cited

U.S. PATENT DOCUMENTS

2004/0268283 A1* 12/2004 Perry ................. G06F 17/5045
                                                716/119

* cited by examiner

*Primary Examiner* — Suresh Memula
(74) *Attorney, Agent, or Firm* — Mark H. Whittenberger, Esq.; Holland & Knight LLP

(57) ABSTRACT

The present disclosure relates to a computer-implemented method for use in an electronic circuit design. Embodiments may include providing an electronic design having a plurality of geometric elements and generating a non-design element. Embodiments may further include associating the non-design element with one of the plurality of geometric elements and storing the non-design element with the one of the plurality of geometric elements. Embodiments may also include displaying, at a graphical user interface, the non-design element upon selection of the geometric element.

20 Claims, 9 Drawing Sheets

SYSTEM AND METHOD FOR GENERATING NON-DESIGN MANIPULATION ELEMENTS IN AN ELECTRONIC DESIGN

FIELD OF THE INVENTION

The present disclosure relates to electronic design automation, and more specifically, to a system and method for generating non-design manipulation elements in an electronic design.

DISCUSSION OF THE RELATED ART

Electronic design automation (EDA) utilizes software tools that may be used in the design and analysis of numerous electronic systems such as printed circuit boards (PCBs) and integrated circuits (ICs). In the design of electronic systems, it is necessary to manipulate system elements within a three-dimensional ("3D") space. In order to understand how the various pieces of a system (e.g., boards, backplanes, enclosures, and cabling) fit together, functionality must be provided to allow for the positioning of the graphic elements representing the elements.

SUMMARY

In one or more embodiments of the present disclosure, a computer-implemented method is provided. The method may include providing an electronic design having a plurality of geometric elements and generating a non-design element. The method may further include associating the non-design element with one of the plurality of geometric elements and storing the non-design element with the one of the plurality of geometric elements. The method may also include displaying, at a graphical user interface, the non-design element upon selection of the geometric element.

One or more of the following features may be included. In some embodiments, the non-design element may be associated with positional data governing positioning of the geometric element. Associating may include associating a plurality of non-design elements with one of the plurality of geometric elements. The method may further include simultaneously displaying the non-design element and a second non-design element associated with a second geometric element. The method may also include assigning the non-design element with a type, the type defining one or more attributes and capabilities. The attributes may include one or more of size, shape, name, color, direction, orientation, and rules. The method may also include allowing, at the graphical user interface, a user to create or edit the non-design element.

In some embodiments, a computer-readable storage medium having stored thereon instructions that when executed by a machine result in one or more operations is provided. Operations may include providing an electronic design having a plurality of geometric elements and generating a non-design element. Operations may further include associating the non-design element with one of the plurality of geometric elements and storing the non-design element with the one of the plurality of geometric elements. Operations may also include displaying, at a graphical user interface, the non-design element upon selection of the geometric element.

One or more of the following features may be included. In some embodiments, the non-design element may be associated with positional data governing positioning of the geometric element. Associating may include associating a plurality of non-design elements with one of the plurality of geometric elements. Operations may further include simultaneously displaying the non-design element and a second non-design element associated with a second geometric element. Operations may also include assigning the non-design element with a type, the type defining one or more attributes and capabilities. The attributes may include one or more of size, shape, name, color, direction, orientation, and rules. Operations may also include allowing, at the graphical user interface, a user to create or edit the non-design element.

In one or more embodiments of the present disclosure, a system is provided. The system may include a computing device having at least one processor configured to provide an electronic design having a plurality of geometric elements. The at least one processor may be further configured to generate a non-design element and associate the non-design element with one of the plurality of geometric elements. The at least one processor may be further configured to store the non-design element with the one of the plurality of geometric elements and display, at a graphical user interface, the non-design element upon selection of the geometric element.

One or more of the following features may be included. In some embodiments, the non-design element may be associated with positional data governing positioning of the geometric element. The at least one processor may be further configured to associate a plurality of non-design elements with one of the plurality of geometric elements. The at least one processor may be further configured to simultaneously display the non-design element and a second non-design element associated with a second geometric element. The at least one processor may be further configured to assign the non-design element with a type, the type defining one or more attributes and capabilities. The attributes may include one or more of size, shape, name, color, direction, orientation, and rules.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
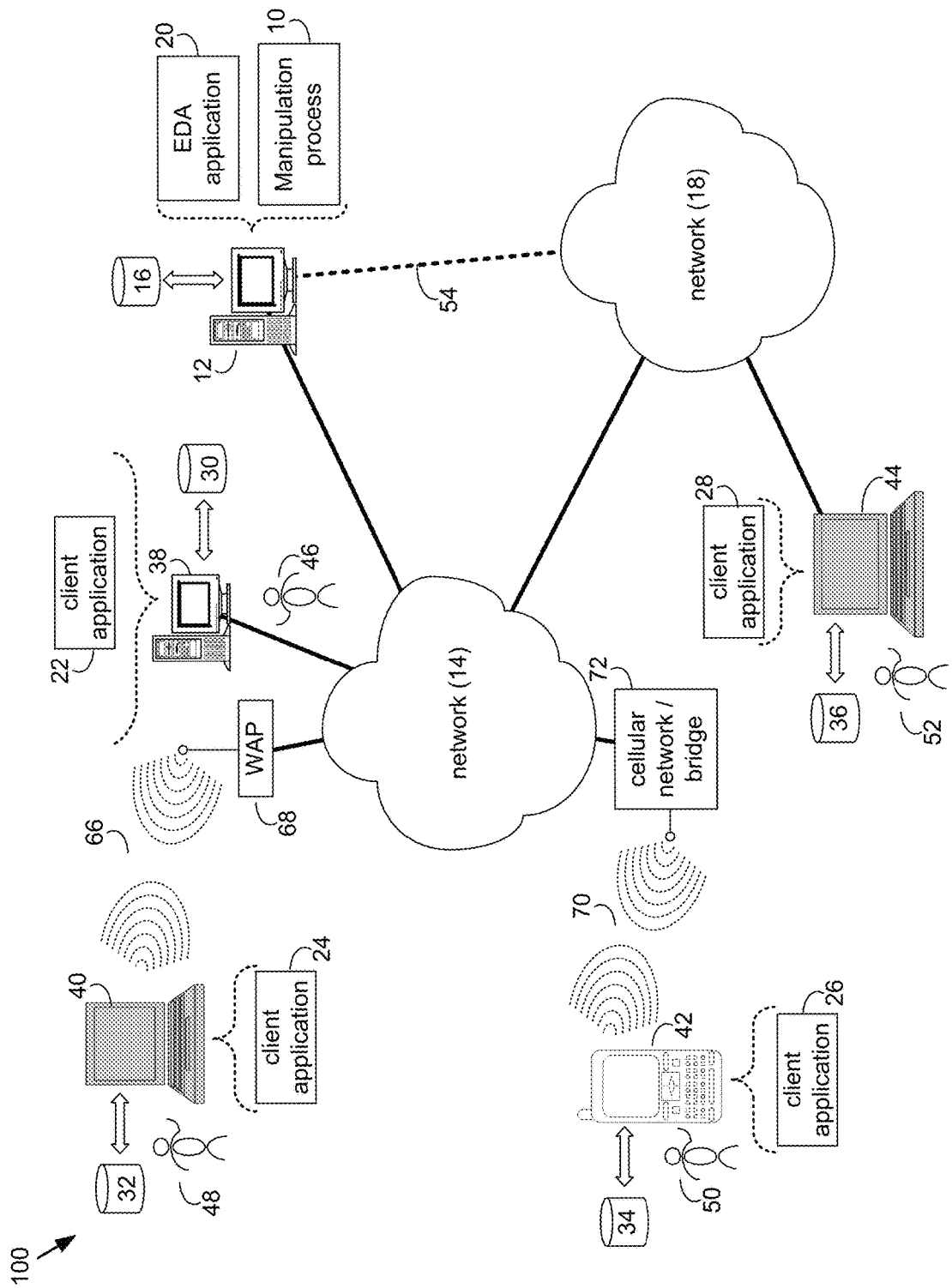
FIG. 1 is a system diagram depicting aspects of the manipulation process in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, $C^{++}$ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, one or more processes that may reside on and may be executed by server computer 12, which may be connected to network 14 (e.g., the Internet or a local area network) are provided. Embodiments of the present disclosure are directed towards a manipulation process which is discussed in further detail hereinbelow. Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the processes described herein may reside on and be executed, in whole or in part, by a client electronic device, such as a personal computer, notebook computer, personal digital assistant, or the like.

The instruction sets and subroutines of process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language ("HDL") files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example. Manipulation process 10 may be a cloud based process as some or all of the operations described herein may occur in the cloud, either in whole or in part.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Manipulation process 10 may be a stand alone application, or may be an applet/application/script that may interact with and/or be executed within EDA application 20. In addition/as an alternative to being a server-side process, process 10 may be a client-side process (not shown) that may reside on a client electronic device (described below) and may interact with an EDA client application (e.g., one or more of EDA client applications 22, 24, 26, 28). Further, manipulation process 10 may be a hybrid server-side/client-side process that may interact with EDA application 20 and an EDA client application (e.g., one or more of client applications 22, 24, 26, 28). As such, process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
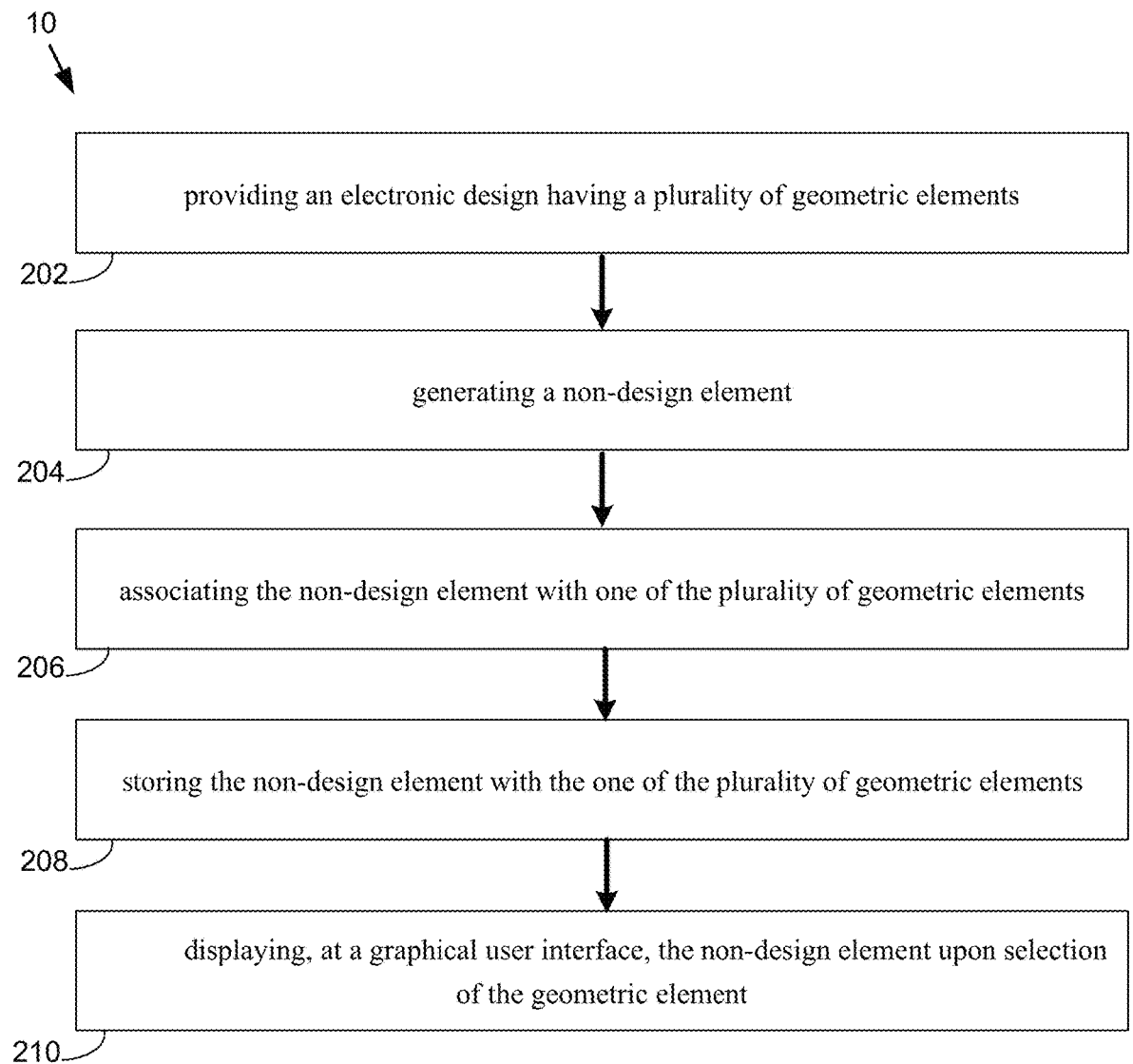
FIG. 2 is a flowchart depicting operations consistent with the manipulation process of the present disclosure.

Referring now to FIG. 2, an embodiment of manipulation process 10 is provided. The process may include providing (202) an electronic design having a plurality of geometric elements and generating (204) a non-design element. The method may further include associating (206) the non-design element with one of the plurality of geometric elements and storing (208) the non-design element with the one of the plurality of geometric elements. The method may also include displaying (210), at a graphical user interface, the non-design element upon selection of the geometric element.

In some embodiments, the term "coupling" may be used interchangeably with the term non-design element. A non-design element is one that may displayed on a graphical user interface to assist the designer, however, the non-design element is not a part of the actual design. As is discussed in further detail below, these non-design elements or couplings may provide an easy, intuitive, and highly flexible way to manipulate three dimensional ("3D") graphic elements.

Referring now to FIGS. 3-9, embodiments consistent with manipulation process 10 are provided. In the design of electronic systems, it is often necessary to manipulate system elements within a 3D space. In order to understand how the various pieces of a system (e.g., boards, backplanes, enclosures, and cabling) fit together, functionality must be provided to allow for the positioning of the graphic elements representing the elements.

Figure 3:
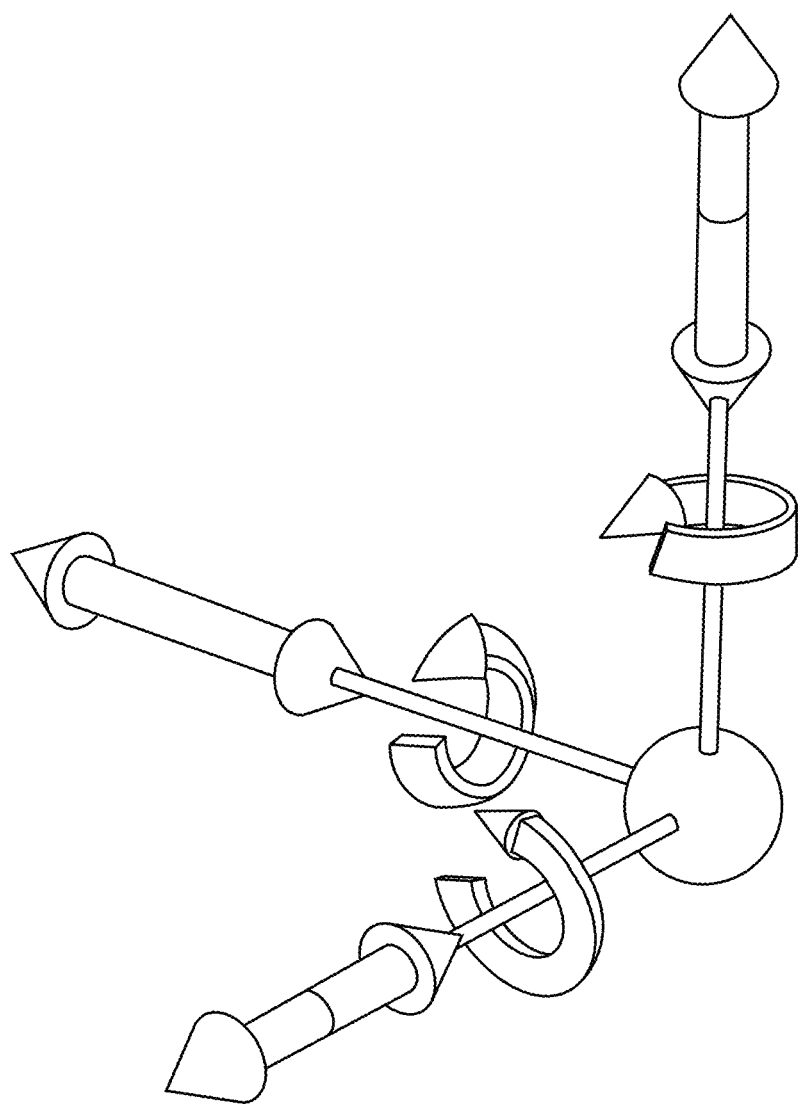
FIG. 3 is a diagram depicting aspects of the manipulation process in accordance with an embodiment of the present disclosure.
Figure 4:
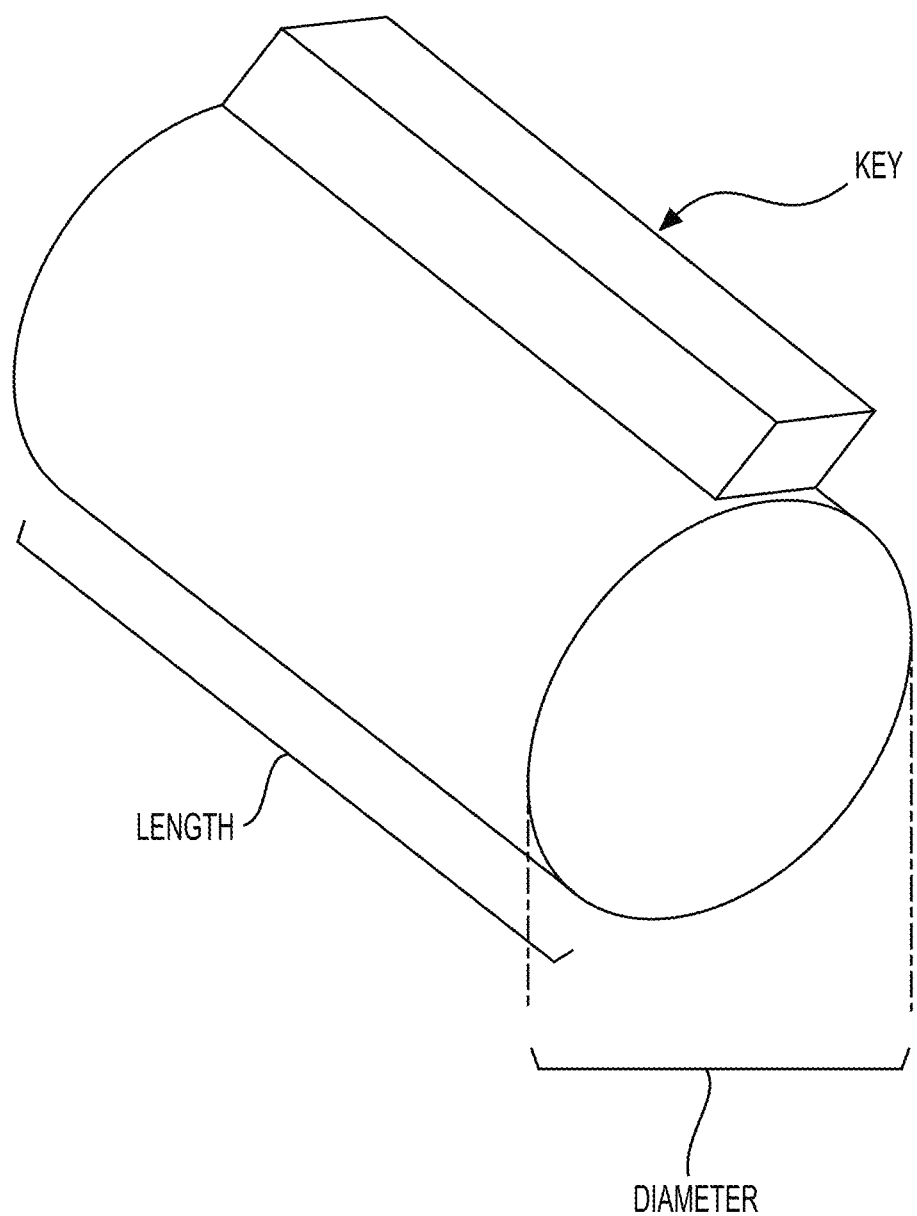
FIG. 4 is a diagram depicting aspects of the manipulation process in accordance with an embodiment of the present disclosure.
Figure 5:
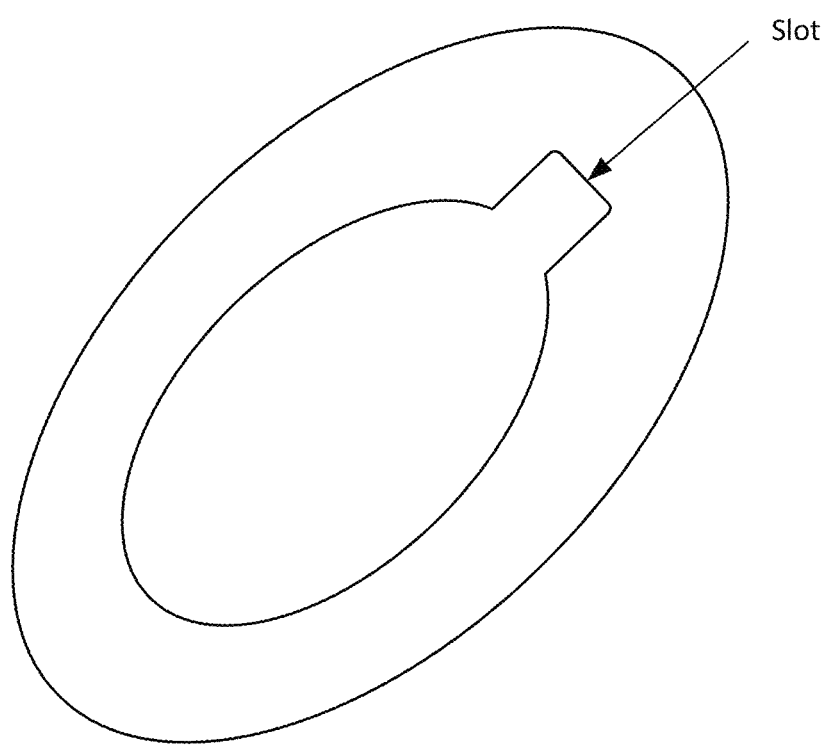
FIG. 5 is a diagram depicting aspects of the manipulation process in accordance with an embodiment of the present disclosure.

Referring to FIG. 3, some design systems provide a manipulator widget that may be used to move and rotate system elements. While this gives the user a great degree of capability, it takes a discerning eye and steady hand to gain the level of accuracy necessary for 3D systems. Likewise, a methodology of multiple coordinate systems can be used to move system elements in a 3D space.

Embodiments included herein describe one or more couplings that may be configured to provide a methodology for manipulating system elements with a high level of accuracy. As is discussed below, the couplings described herein are also easy and intuitive for the designer to use.

In some embodiments, couplings may include non-design graphic elements used to manipulate 3D graphic elements. They are "non-design" in that they are not part of the system being represented. Rather, they are graphic elements that assist in interacting with the design elements.

In some embodiments, the couplings may be organized by type. That is, all couplings have a type, which defines different sets of attributes and capabilities. While some of the attributes and capabilities may overlap between types, types may be unique. There may be a wide variety of attributes for couplings. Some of these may include, but are not limited to, size, shape, name, and color. However, the notion of attributes can be expanded to include items such as direction, orientation, manufacturer, part number, and rules.

In some embodiments, type pairs of couplings may have a relationship. This relationship may be defined by a set of rules. For example, a type of coupling may have an affinity for couplings of another particular type. Couplings may be associated with design elements. In some embodiments, and merely by way of example, a coupling may only be associated with one design element. Each design element may be associated with multiple couplings.

In some embodiments, once associated with a design element, the placement of the coupling may affect the design element's placement. That is, when a coupling is moved, either manually or programmatically, with its associated rules and affinity for couplings of other types in play, the design element moves as well. Accordingly, what is done spatially to the coupling may also be done to the design element. Programmatically manipulating design elements using couplings provides the designer with a powerful tool.

The previous section describes couplings in an abstract fashion. This is important to do because couplings become more powerful a tool through the extension of the abstractions. However, it might be a bit difficult to envision all the nuances of couplings.

Referring now to FIGS. 4-9, embodiments of manipulation process depicting a number of more concrete examples are provided. In this particular example, two types of couplings are available, namely a keyed cylinder and a slotted hole. A keyed cylinder generally appears as in FIG. 4, with the length, diameter and key position variable. Here, the key is displayed on the outside of the cylinder, however, it may also be located on the inside of the cylinder (hence a different type of coupling). Likewise, a slotted hole generally appears as in FIG. 5, with diameter and slot position variable.

Figure 6:
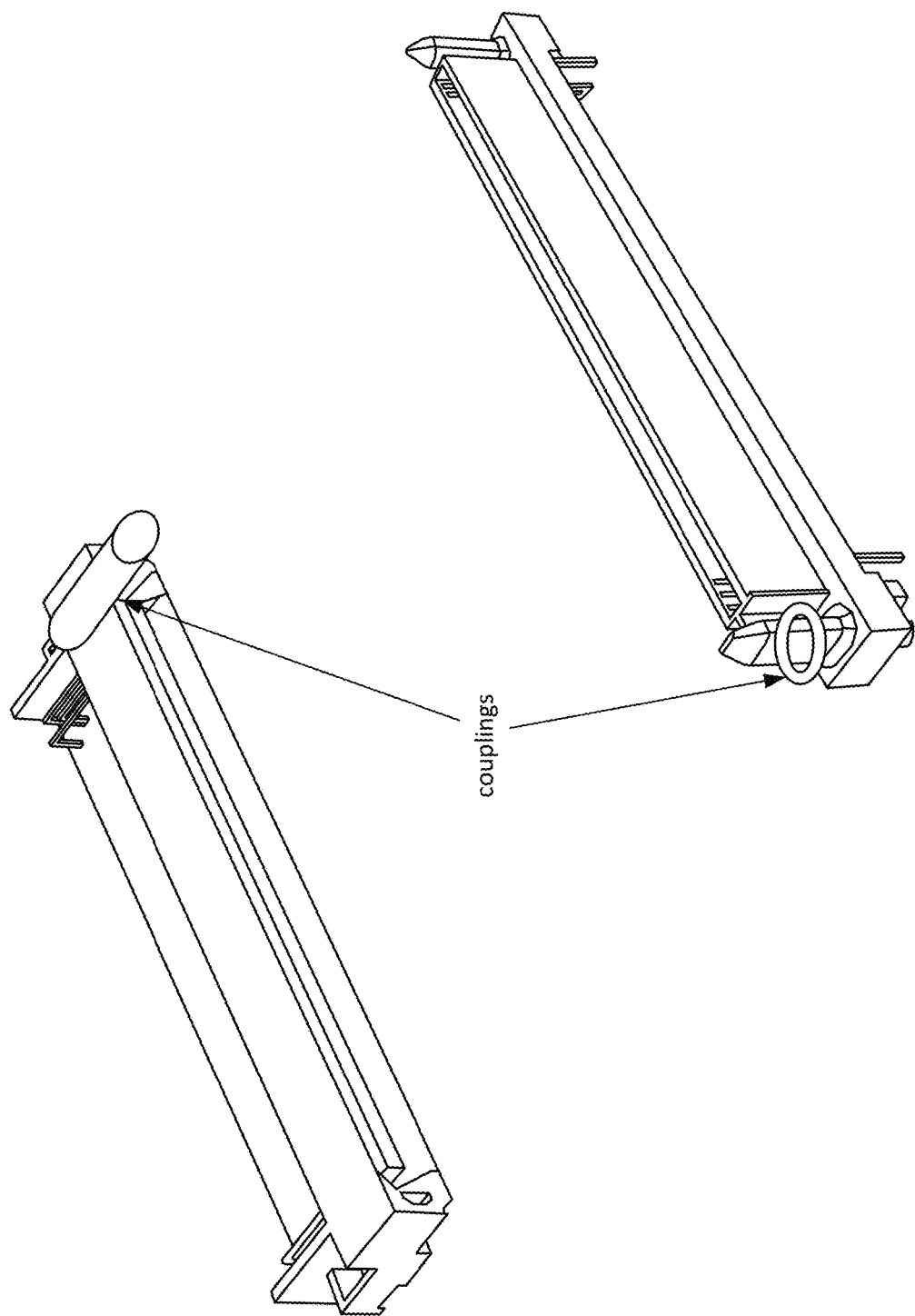
FIG. 6 is a diagram depicting aspects of the manipulation process in accordance with an embodiment of the present disclosure.

In this example, assume that two couplings have been instantiated: one a keyed cylinder and one a slotted hole. Each has been associated with a different design graphic element. After being associated, each coupling may be assigned a position in space. The position may be anywhere in space, for example, it does not have to be overlapping or touching the associated design graphic element (but it could, if desired). FIG. 6 illustrates this.

In operation, a command may be executed where the two couplings are first selected, and then automatically "connected". Accordingly, for a keyed cylinder/slotted hole pairing, the cylinder may be placed into the hole, aligned by their respective center points and oriented by their direction and the cylinder key and hole slot may be aligned.

Figure 7:
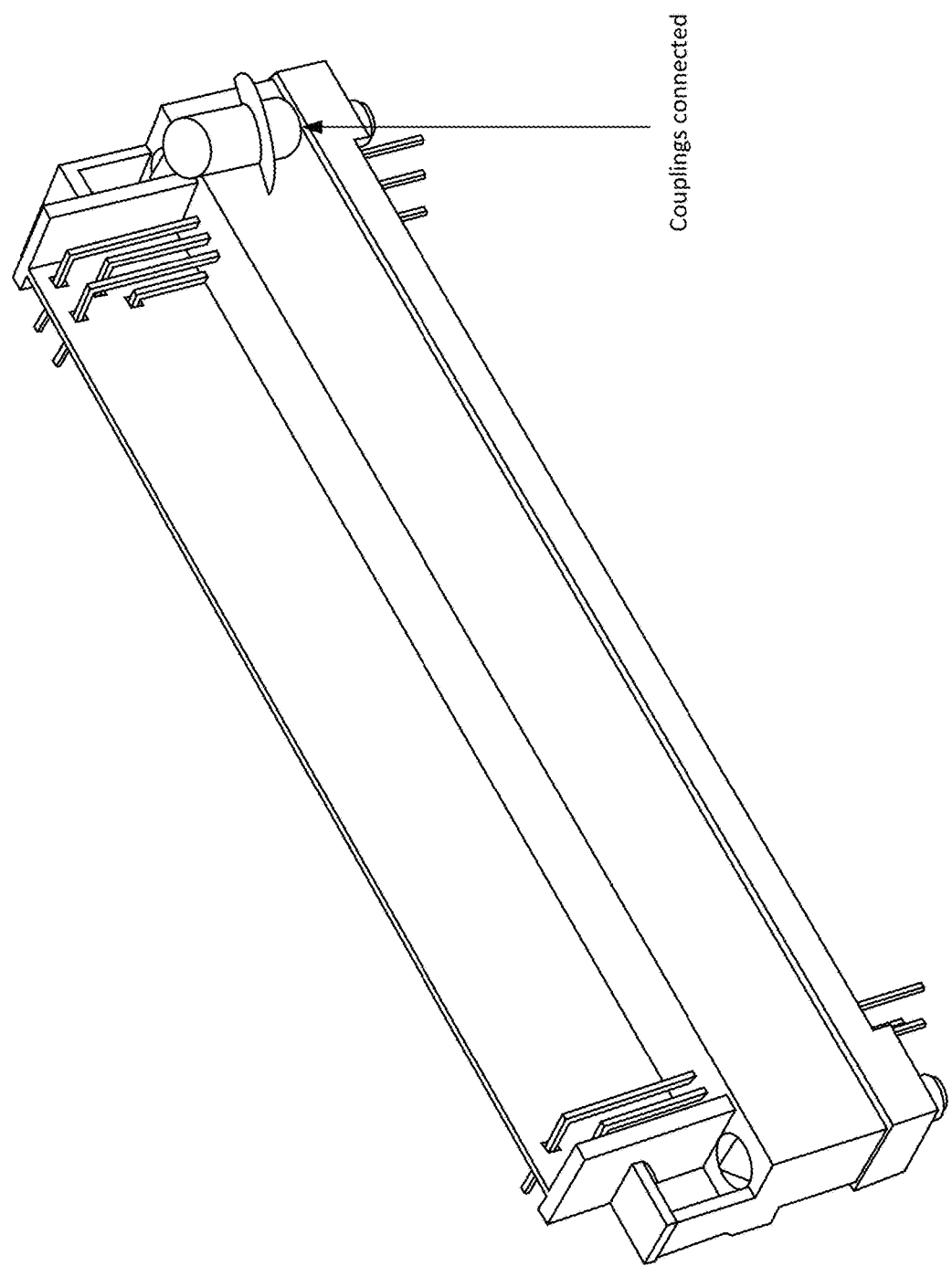
FIG. 7 is a diagram depicting aspects of the manipulation process in accordance with an embodiment of the present disclosure.

Since the design graphic elements may be attached to the couplings, they are brought along in space, and positioned as well. If the couplings are aligned (using the underlying software), and the couplings may be appropriately placed with regard to each's associated design graphic element, then the design graphic elements are aligned correctly as shown in FIG. 7.

It should be noted that the example provided above, is merely one possible representation. While illustrative, the concrete example does not show the nuances and possibilities available using the manipulation process 10 of the present disclosure.

As discussed above, the concrete example has two types of couplings. However, there may be many different types of couplings. A rich set of couplings types may be devised to model different types of spatial relationships. For example, keyed cylinders and slotted holes have been described. However, various configurations of couplings may be used without departing from the scope of the present disclosure. Some of these may include, but are not limited to, "ball" and "socket" couplings, "gear" couplings, and "flat edged" couplings, etc. The concept of couplings may be extended as new types may be added.

In some embodiments, the relationships of type pairs allows for the description of a rich set of spatial positionings. In the example, one relationship between keyed cylinders and slotted holes is that they "fit" together. The relationship could conceivably have much more detail as described in further detail below.

In some embodiments, rules describe these details. The keyed cylinder/slotted hole type pair might have a number of rules. For example, the diameter of the cylinder must be less than the diameter of the hole, the size/shape of the key must match the slot, the cylinder should only descend into the hole to a certain depth, and/or the cylinder should only enter the hole from a certain direction, etc.

In the concrete example provided above, each design element had only one coupling associated. However, each design element may have many couplings associated with it. Multiple couplings could describe the multiple ways a design element could interact with other design elements.

In some embodiments, it may be possible to manipulate design elements using more than one pair of couplings. Multiple pairs of couplings may be used, however, all of the rules for the multiple pairs must be satisfied to position the design elements successfully.

In some embodiments, although a coupling associated with a design element assumes the orientation of the design element, this does not preclude applying an additional orientation to the coupling. In this way, a coupling may be "tilted", for example, as compared to the design element.

Couplings may embody the knowledge of how design elements interact spatially. This knowledge may be associated with design elements on a permanent basis and, as such, it may be stored. Storing the coupling information means it can be used when the design element is used in different systems.

Embodiments of manipulation process 10 may allow a designer to create, edit, delete, and/or connect one or more couplings. Each of these options is discussed in further detail hereinbelow.

In operation, in order to create a coupling, the designer may select an object with which a coupling is to be associated. When an object that may have a coupling associated with it is selected, the pull-right menu may be altered such that the Create Coupling entry is enabled. When the Create Coupling entry is selected, the Options Tab may be filled in with appropriate controls. These controls may vary based on coupling type. Therefore, the topmost control is a selection box containing the current type, and the list of valid types to choose from. A small representation of the current type of coupling may be displayed on the cursor. Also, the controls in the Options Tab may automatically change as the current coupling type changes. The user may provide the necessary information via the Options Tabs controls to position the coupling. The pull right menu may contain two entries: Done and Cancel. If Done is selected, the coupling may be created and displayed on the canvas, and the interactive command ended. If Cancel is selection, the interactive command may be ended, and no coupling is created. When the create coupling interactive command is ended, the cursor and the pull right menu may be restored. The object remains selected.

In some embodiments, the attributes of existing couplings may be changed. In operation, in order to edit a coupling, the designer may select a coupling and once a coupling is selected, the pull-right menu may be altered such that the Edit Coupling entry enabled. When the Edit Coupling entry is selected, the Options Tab may be filled in with appropriate controls. At this point, the operations may be similar as for the Create Coupling interactive command with the following exception: when the Cancel pull right popup menu entry is selected, the selected coupling may be restored to its previous state.

In operation, in order to delete a coupling, the designer may select a coupling and when a coupling is selected, the pull-right menu may be altered such that the Delete Coupling entry enabled. When the Delete Coupling entry is selected, the coupling is made transparent, and the pull right popup menu contains two entries: Done and Cancel. If Done is selected, the coupling may be deleted from the system, and the interactive command ends. If Cancel is selected, the coupling is restored to its previous state, and the interactive command ends.

Embodiments included herein provide the ability to select and move a coupling (and have the connected graphic element move). However, the teachings of the present disclosure may also provide the ability to manipulate couplings programmatically. Accordingly, to connect couplings, the Connect Couplings command may be available on the pull right menu. In operation, in order to connect couplings, the designer may select the coupling to move and also select the coupling to use as the destination. When the Connect Couplings command is invoked, the Options Tab may be updated to contain any necessary parameters. When the destination coupling is selected, the coupling that was selected for movement may be moved appropriately based on the location and orientation of the destination. Through the Connect Couplings command, a pull right menu may be made available. The pull right menu contains two items: Done and Cancel. If Done is selected, the first coupling (and its attached graphic element) remains moved. If Cancel is selected, the first coupling may be restored to its previous location, and items highlighted are restored.

Figure 8:
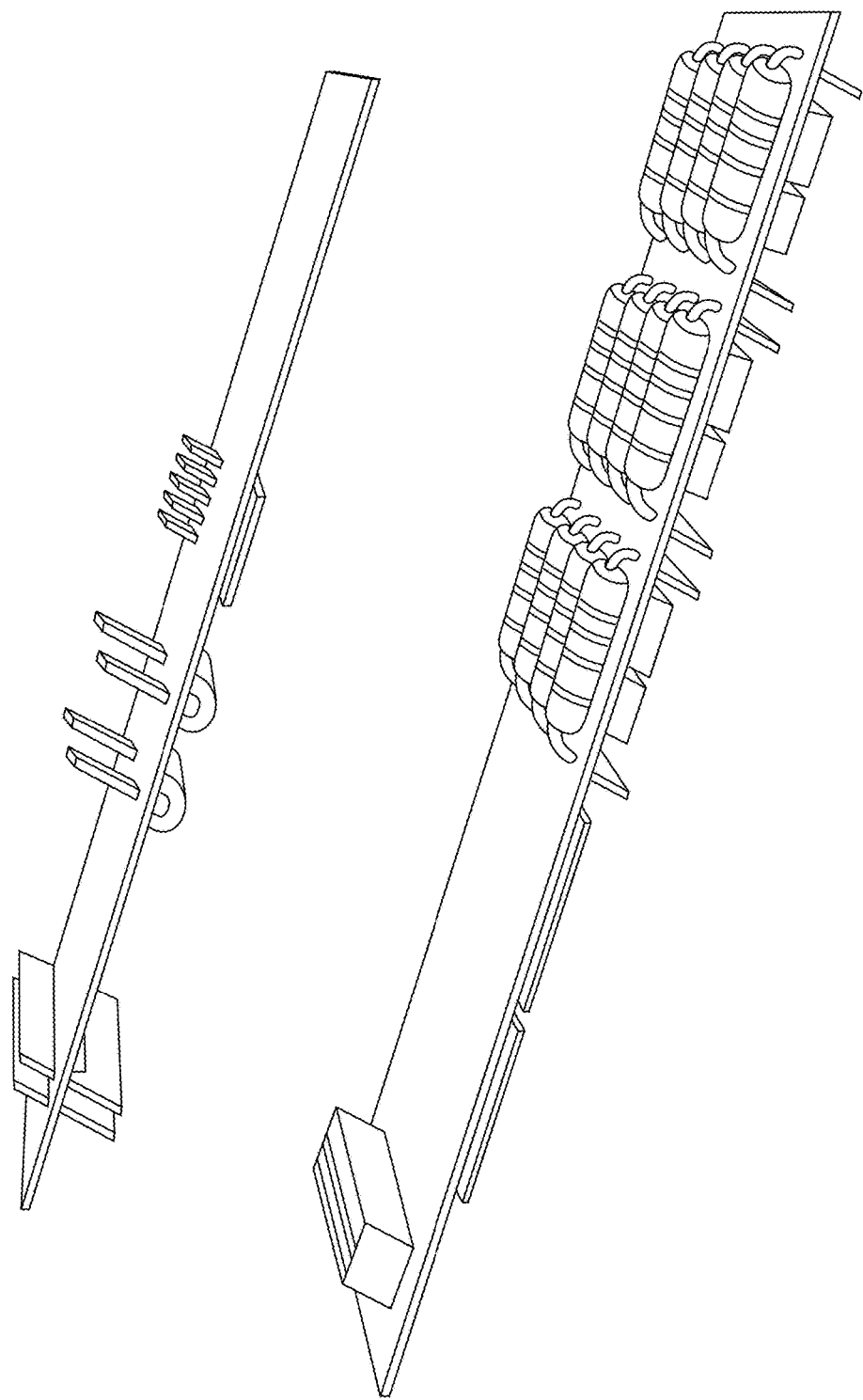
FIG. 8 is a diagram depicting aspects of the manipulation process in accordance with an embodiment of the present disclosure.
Figure 9:
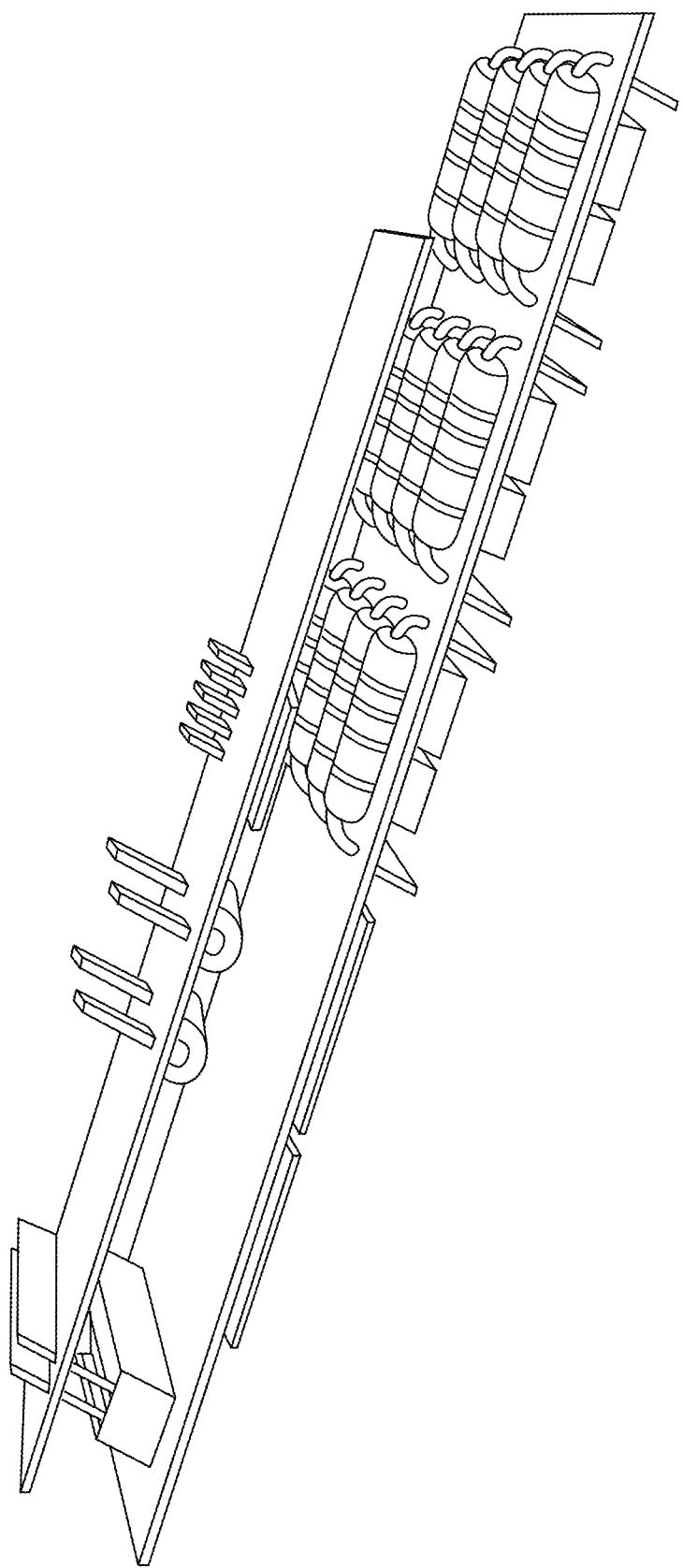
FIG. 9 is a diagram depicting aspects of the manipulation process in accordance with an embodiment of the present disclosure.

Referring now to FIGS. 8-9, an example application of manipulation process 10 is provided. FIG. 8 shows an electronic system consisting of two main system elements. For the system to work, the second board needs to be plugged into the first board. In the design process, the designer needs to make sure components on both boards do not physically touch. One way of doing this is to physically model the designs, and actually plug them together. Couplings can be used to achieve this: note the male and female connectors on the boards. These may correspond to the same connectors noted in previous diagrams. With couplings assigned, the process of plugging the second board into the first can be simplified. FIG. 9 shows the two boards successfully mated.

In some embodiments, EDA application 20 and/or manipulation process 10 may support a variety of languages and/or standards. EDA application 20 may support one or more software extensions and may be used in conjunction with one or more EDA tools such as those available from the Assignee of the subject application.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method in an electronic circuit design comprising:
   providing an electronic design having a plurality of geometric elements;
   generating a non-design element, wherein the non-design element is a graphical element configured to allow for manipulation of the plurality of geometric elements;
   associating the non-design element with one of the plurality of geometric elements;
   storing the non-design element with the one of the plurality of geometric elements; and
   displaying, at a graphical user interface, the non-design element upon selection of the geometric element.

2. The computer-implemented method of claim 1, wherein the non-design element is associated with positional data governing positioning of the geometric element.

3. The computer-implemented method of claim 1, wherein associating includes associating a plurality of non-design elements with one of the plurality of geometric elements.

4. The computer-implemented method of claim 1, further comprising:
   simultaneously displaying the non-design element and a second non-design element associated with a second geometric element.

5. The computer-implemented method of claim 1, further comprising:
   assigning the non-design element with a type, the type defining one or more attributes and capabilities.

6. The computer-implemented method of claim 5, wherein the attributes include one or more of size, shape, name, color, direction, orientation, and rules.

7. The computer-implemented method of claim 1, further comprising:
   allowing, at the graphical user interface, a user to create or edit the non-design element.

8. A non-transitory computer-readable storage medium having stored thereon instructions that when executed by a machine result in the following operations:
   providing an electronic design having a plurality of geometric elements;
   generating a non-design element, wherein the non-design element is a graphical element configured to allow for manipulation of the plurality of geometric elements;
   associating the non-design element with one of the plurality of geometric elements;
   storing the non-design element with the one of the plurality of geometric elements; and
   displaying, at a graphical user interface, the non-design element upon selection of the geometric element.

9. The non-transitory computer-readable storage medium of claim 8, wherein the non-design element is associated with positional data governing positioning of the geometric element.

10. The non-transitory computer-readable storage medium of claim 8, wherein associating includes associating a plurality of non-design elements with one of the plurality of geometric elements.

11. The non-transitory computer-readable storage medium of claim 8, further comprising:
    simultaneously displaying the non-design element and a second non-design element associated with a second geometric element.

12. The non-transitory computer-readable storage medium of claim 8, further comprising:
    assigning the non-design element with a type, the type defining one or more attributes and capabilities.

13. The non-transitory computer-readable storage medium of claim 12, wherein the attributes include one or more of size, shape, name, color, direction, orientation, and rules.

14. The non-transitory computer-readable storage medium of claim 8, further comprising:
    allowing, at the graphical user interface, a user to create or edit the non-design element.

15. A system comprising:
    a computing device having at least one processor configured to provide an electronic design having a plurality of geometric elements, the at least one processor further configured to generate a non-design element, wherein the non-design element is a graphical element configured to allow for manipulation of the plurality of geometric elements, and associate the non-design element with one of the plurality of geometric elements, the at least one processor further configured to store the non-design element with the one of the plurality of geometric elements and display, at a graphical user interface, the non-design element upon selection of the geometric element.

16. The system of claim 15, wherein the non-design element is associated with positional data governing positioning of the geometric element.

17. The system of claim 15, wherein the at least one processor is further configured to associate a plurality of non-design elements with one of the plurality of geometric elements.

18. The system of claim 15, wherein the at least one processor is further configured to simultaneously display the non-design element and a second non-design element associated with a second geometric element.

19. The system of claim 15, wherein the at least one processor is further configured to assign the non-design element with a type, the type defining one or more attributes and capabilities.

20. The system of claim 19, wherein the attributes include one or more of size, shape, name, color, direction, orientation, and rules.

* * * * *